United States Patent
Rishi et al.

(10) Patent No.: US 10,229,256 B2
(45) Date of Patent: Mar. 12, 2019

(54) TECHNIQUES FOR PREVENTING VOICE REPLAY ATTACKS

(71) Applicant: Intel Corporation, Santa Clara, CA (US)

(72) Inventors: Karthik K. Rishi, Portland, OR (US); Bratin Saha, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,790

(22) PCT Filed: Oct. 25, 2013

(86) PCT No.: PCT/US2013/066880
§ 371 (c)(1),
(2) Date: Dec. 27, 2013

(87) PCT Pub. No.: WO2015/060867
PCT Pub. Date: Apr. 30, 2015

(65) Prior Publication Data
US 2016/0234204 A1    Aug. 11, 2016

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/31* (2013.01); *G06F 21/34* (2013.01);
(Continued)

(58) Field of Classification Search
None
See application file for complete search history.

(56) References Cited

U.S. PATENT DOCUMENTS

| | | | |
|---|---|---|---|
| 2003/0172271 A1* | 9/2003 | Silvester | H04L 63/08 713/170 |
| 2004/0098253 A1* | 5/2004 | Balentine | G10L 15/222 704/215 |

(Continued)

OTHER PUBLICATIONS

International Search Report and Written Opinion received for PCT International Patent Application No. PCT/US2013/066880, dated Jul. 10, 2014, 12 pages.

(Continued)

*Primary Examiner* — Eleni A Shiferaw
*Assistant Examiner* — Andrew J Steinle
(74) *Attorney, Agent, or Firm* — Barnes & Thornburg LLP

(57) ABSTRACT

Technologies for authenticated audio login by a user of a computing device include generating a security token having a plurality of token characters. The computing device renders the generated security token to a current user of the computing device on an output device of the computing device. The computing device, receives security token audio input from the current user and retrieves, based on the rendered security token, voice profile data of an authorized user of the computing device from a voice profile database. The voice profile database includes voice data based on the authorized user's prior recitation of each token character of a set of token characters from which the security token may be composed. The computing device compares the received security token audio input and the retrieved voice profile data to verify that the current user is the authenticated user and the current user recited the rendered security token.

23 Claims, 6 Drawing Sheets

(51) Int. Cl.
  *G06F 21/34* (2013.01)
  *G06F 21/31* (2013.01)
  *H04L 29/06* (2006.01)

(52) U.S. Cl.
  CPC ...... *H04L 63/0428* (2013.01); *H04L 63/0861* (2013.01); *H04L 63/10* (2013.01); *H04L 63/1433* (2013.01)

(56) References Cited

U.S. PATENT DOCUMENTS

| | | | | |
|---|---|---|---|---|
| 2005/0089172 | A1* | 4/2005 | Fujimoto | G06F 21/32 380/275 |
| 2008/0072064 | A1* | 3/2008 | Franchi | G06F 21/32 713/186 |
| 2010/0106975 | A1* | 4/2010 | Vandervort | G06F 21/32 713/186 |
| 2011/0143715 | A1* | 6/2011 | Labrador | H04M 3/382 455/411 |
| 2013/0159194 | A1* | 6/2013 | Habib | G06F 21/32 705/66 |
| 2014/0006825 | A1* | 1/2014 | Shenhav | G06F 1/3206 713/323 |

OTHER PUBLICATIONS wikipedia.org, "Speaker recognition," Wikipedia, The Free Encyclopedia, retrieved from: <http://en.wikipedia.org/w/index.php?title=Speaker_recognition&oldid=55716799>, edited May 28, 2013, 5 pages.

wikipedia.org, "SecurID," Wikipedia, The Free Encyclopedia, retrieved from: <http://en.wikipedia.org/w/index.php?title=SecurID&oldid=554805916>, edited May 13, 2013, 6 pages.

Nuance Communications, Inc., "Nuance Voice Biometrics :: Improving the Caller Experience," Mar. 2012, 2 pages.

* cited by examiner ular) acoustic models of the user to determine whether the user's voice matches the voice used to enroll the user with the computing device 102.

TECHNIQUES FOR PREVENTING VOICE REPLAY ATTACKS

CROSS REFERENCE TO RELATED APPLICATIONS

This application is a national stage entry under 35 USC § 371(b) of International Application No. PCT/US2013/066880, which was filed Oct. 25, 2013.

BACKGROUND

Authentication is a critical mechanism for maintaining the privacy and security of a computing device or particular resources. Accordingly, a wide array of techniques and/or protocols may be implemented to verify that the user is the person he or she is claiming to be. Typical authentication systems require the user to enter a passphrase, which is compared to a passphrase stored on the computing device. For example, the user's entered passphrase may be compared with a default or pre-selected passphrase of the computing device (e.g., prior to the user's selection of an alternative passphrase) or a passphrase selected by the user (e.g., a password chosen during an enrollment process).

Voice biometrics and speaker verification are often employed to authenticate a current user of a computing device. Voice authentication permits users to "enter" a passphrase in a hands-free manner via audio input (i.e., by the user speaking into a microphone). Typical voice authentication systems require each user to enroll prior to use so that the computing device may generate a voice profile and/or other acoustic data for the particular user. For example, the computing device may generate and store a voiceprint of the user based on the user repeating the passphrase a predetermined amount of times. Then, the computing device is later able to compare the user's recitation of the passphrase to the stored voiceprint for the user. Although one objective of voice biometric authentication is oftentimes to improve the security of a system, voice biometrics are nonetheless susceptible to certain forms of security attacks (e.g., voice replay attacks).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
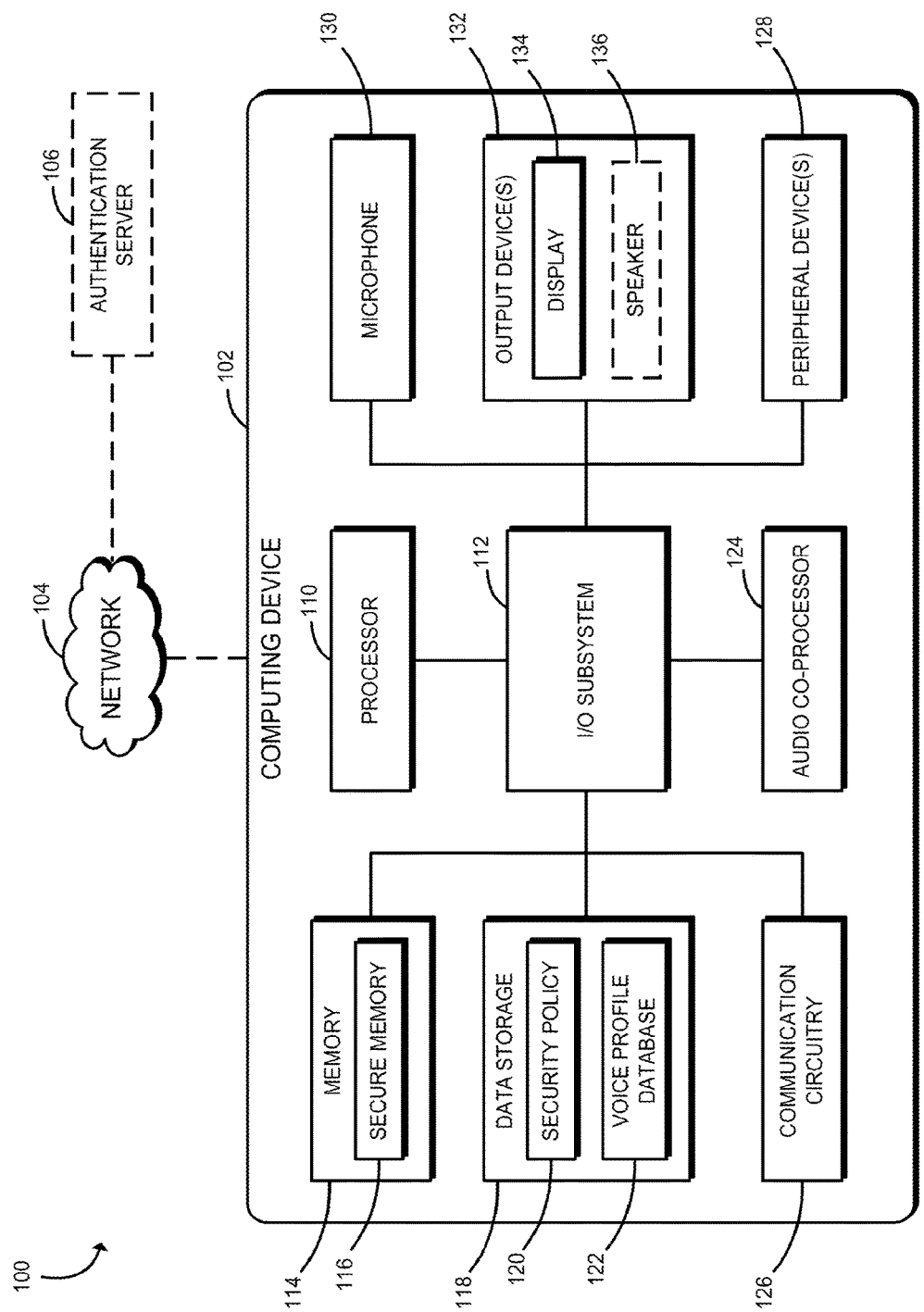
FIG. 1 is a simplified block diagram of at least one embodiment of a system for authenticated login by a user of a computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for authenticated login by a user includes a computing device 102 and, in some embodiments, may include a network 104 and an authentication server 106. In use, as described in more detail below, the computing device 102 is configured to enroll a user for voice authentication and to validate the user's audio input to wake up the computing device 102 and/or login to the computing device 102. In the illustrative embodiment, the computing device 102 employs a two-tier login mechanism in which the user is to input a biometric-independent wake-up phrase to "wake" the computing device 102 from a sleep state and audibly recite a rendered security token to the computing device 102 to login to the computing device 102. As described below, the audio input received from the user is compared to voice-specific (i.e., biometric-dependent) voice data previously stored for login authentication of the user. Additionally, in some embodiments, the security token generation, data retrieval, and authentication are all handled locally on the computing device 102.

The computing device 102 may be embodied as any type of computing device capable of authenticating a user's audio input and performing the functions described herein. For example, the computing device 102 may be embodied as a smartphone, a tablet computer, a laptop computer, a desktop computer, server, web portal device, personal digital assistant, mobile Internet device, and/or any other computing/communication device. As shown in FIG. 1, the illustrative computing device 102 includes a processor 110, an input/output ("I/O") subsystem 112, a memory 114, a secure memory, a data storage 118, a security policy 120, a voice profile database 122, an audio co-processor 124, a communication circuitry 126, one or more peripheral devices 128, a microphone 130, and one or more output devices 132. The output devices 132 include a display 134 and may, in some embodiments, include other output devices (e.g., a speaker 136). Of course, the computing device 102 may include other or additional components, such as those commonly found in a typical computing device (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 102, on a single integrated circuit chip. As shown in the illustrative embodiment and discussed in more detail below, the memory 114 may include a secure memory 116 to store, for example, cryptographic keys, security tokens, and/or other authentication data. In some embodiments, the secure memory 116 may be embodied as a memory device separate from the main memory 114.

The data storage 118 may be embodied as any type of device or devices configured for short-term or long-term storage of data such as, for example, memory devices and circuits, memory cards, hard disk drives, solid-state drives, or other data storage devices. As shown in the illustrative embodiment, the data storage 118 includes a security policy 120 and a voice profile database 122. As discussed below, the computing device 102 may prompt a user of the computing device 102 for a wake-up phrase, which may be used to wake the computing device 102 from a low-power sleep state. Accordingly, the computing device 102 may establish a security policy 120 including, for example, wake-up phrase data associated with the wake-up phrase required for waking the computing device 102. Of course, the security policy 120 may include other security and privacy information related, for example, to the wake-up and/or login authentication. In the illustrative embodiment, the voice profile database 122 includes voice data for one or more users of the computing device 102. As described below, the user may enroll to use the voice authentication mechanisms described herein by reciting (i.e., audibly) each of the characters (e.g., textual characters, numerical characters, symbols, etc.) from which the security token may be comprised. Data generated based on the voice enrollment (e.g., a voice profile or other acoustic data) may be stored as voice data in the voice profile database 122.

The audio co-processor 124 may be embodied as any hardware component(s) or circuitry capable of performing the functions described herein. In some embodiments, the audio co-processor 124 may be embodied as a digital signal processor (DSP), microcontroller, low power engine, or other processor or processing/controlling circuit capable of processing audio. In the illustrative embodiment, the audio co-processor 124 is configured to process audio received from the user of the computing device 102 while the processor 110 of the computing device 102 and/or other components of the computing device 102 are in a sleep state (e.g., a low-power state). As such, the audio co-processor 124 may have an independent power supply or power supply connection to allow operation regardless of the state of the main processor 110 and/or the computing device 102. For example, the audio co-processor 124 may be embodied as an out-of-band processor configured to operate independently and in an out-of-band manner relative to the processor 110 of the computing device 102. Additionally, in some embodiments, the audio co-processor 124 may handle all audio processing of the computing device 102 (e.g., voice detection, audio preprocessing/filtering, authentication, etc.).

The communication circuitry 126 may be embodied as any communication circuit, device, or collection thereof, capable of enabling communications between the computing device 102 and other remote devices (e.g., the authentication server 106) over the network 104. To do so, the communication circuitry 126 may use any suitable communication technology (e.g., wireless or wired communications) and associated protocol (e.g., Ethernet, Bluetooth®, WiFi®, WiMAX, etc.) to effect such communication depending on, for example, the type of network, which may be embodied as any type of communication network capable of facilitating communication between the computing device 102 and remote devices.

The peripheral devices 128 of the computing device 102 may include any number of additional peripheral or interface devices. The particular devices included in the peripheral devices 128 may depend on, for example, the type and/or intended use of the computing device 102. The microphone 130 may be embodied as any peripheral or integrated device suitable for capturing audio. For example, the microphone 130 may be used to capture spoken audio input from a user of the computing device 102 (e.g., an audio response to a request by the computing device 102 for a login phrase of the computing device 102).

The output devices 132 of the computing device 102 may include any number of peripheral or integrated devices suitable for rendering output to a user of the computing device 102 (e.g., a display 134 and/or a speaker 136). The display 134 of the computing device 102 may be embodied as any one or more display screens on which information may be displayed to a viewer of the computing device 102. The display 134 may be embodied as, or otherwise use, any suitable display technology including, for example, a liquid crystal display (LCD), a light emitting diode (LED) display, a cathode ray tube (CRT) display, a plasma display, and/or other display technology. Although only a single display 134 is illustrated in FIG. 1, it should be appreciated that the computing device 102 may include multiple displays or display screens on which the same or different content may be displayed contemporaneously or sequentially with each other. The speaker 136 may be embodied as any one or more output devices on which audio may be output/played for a listener of the computing device 102.

As discussed above, the computing device 102 may communicate, in some embodiments, with the authentication server 106 over the network 104. In such embodiments, the network 104 may be embodied as any number of various wired and/or wireless telecommunication networks. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), or any combination thereof.

In those embodiments including the authentication server 106, the authentication server 106 is configured to perform one or more functions of the computing device 102 (e.g., for offloading or security purposes). As discussed below, the authentication server 106 may, for example, generate security tokens for the computing device 102 and securely transmit the generated security tokens to the computing device over the network 104. The authentication server 106 may be embodied as any type of computing device or server capable of performing the functions described herein. For example, in some embodiments, the authentication server 106 may be similar to the computing device 102 as described above. More specifically, the authentication server 106 may be embodied as an enterprise-level server computer, a desktop computer, a laptop computer, a tablet computer, a cellular phone, smartphone, personal digital assistant, mobile Internet device, and/or any other computing/communication device. Further, the authentication server 106 may include components similar to those of the computing device 102 discussed above. The description of those components of the computing device 102 is equally applicable to the description of components of the authentication server 106 and is not repeated herein for clarity of the description. Further, it should be appreciated that the authentication server 106 may include other components, sub-components, and devices commonly found in a computing device or server, which are not discussed above in reference to the computing device 102 and not discussed herein for clarity of the description.

Figure 2:
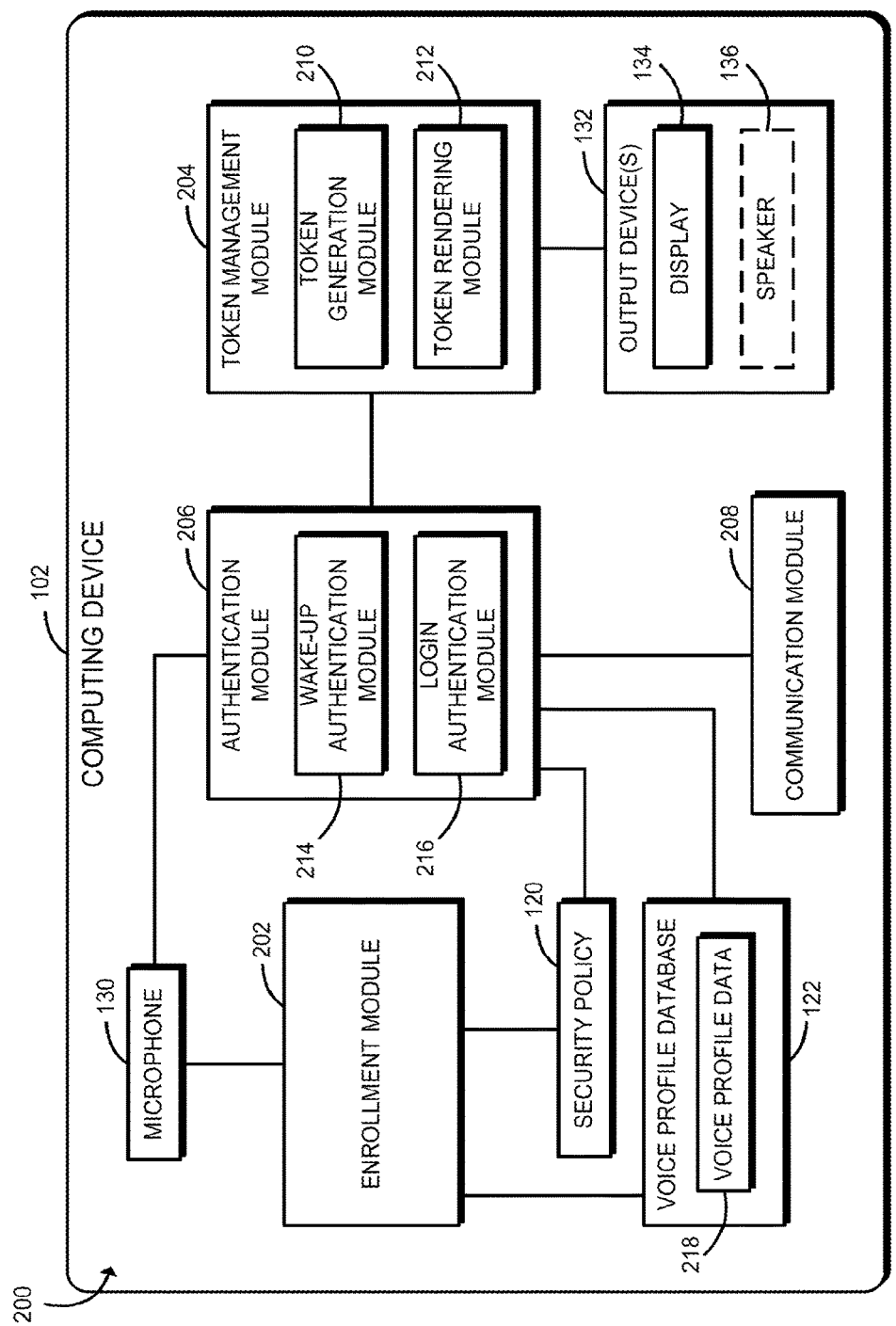
FIG. 2 is a simplified block diagram of at least one embodiment of an environment of the computing device of FIG. 1.

Referring now to FIG. 2, in use, the computing device 102 establishes an environment 200 for authenticated audio login by a user of the computing device 102. As discussed below, the computing device 102 permits a user to enroll in a voice-based authentication system and, thereafter, to login to the computing device 102 based on the user's recitation of a security token rendered on an output device 132 of the computing device 102. The illustrative environment 200 of the computing device 102 includes an enrollment module 202, a token management module 204, an authentication module 206, and a communication module 208. Additionally, as shown in the illustrative embodiment, the token management module 204 includes a token generation module 210 and a token rendering module 212, and the authentication module 206 includes a wake-up authentication module 214 and a login authentication module 216. Each of the enrollment module 202, the token management module 204, the authentication module 206, the communication module 208, the token generation module 210, the token rendering module 212, the wake-up authentication module 214, the login authentication module 216 may be embodied as hardware, software, firmware, or a combination thereof. Additionally, in some embodiments, one of the illustrative modules may form a portion of another module (e.g., the token management module 204 may form a portion of the authentication module 206).

The enrollment module 202 permits one or more users of the computing device 102 to update a wake-up phrase for the computing device 102 and/or to enroll for voice-based authenticated login to the computing device 102. As indicated above, in some embodiments, the computing device 102 may operate in both a normal state and a low-power sleep state. For example, the computing device 102 may transition to the low-power sleep state to save power after a period of inactivity or in response to user input. It should be appreciated that the power consumption levels of the components of the computing device 102 while in the low-power sleep state may vary depending on the particular embodiment and may be established, for example, by the device or component manufacturer or the user.

The computing device 102 has one or more mechanisms to "wake" the computing device 102 from a low-power sleep state. For example, in one embodiment, the user may simply press a power button of the computing device 102 so that the user may login to the computing device 102 (e.g., prompting the user for login information on the display 134). In the illustrative embodiment, however, the computing device 102 monitors for audio input of a user of the computing device 102 (e.g., via the microphone 130) and wakes the computing device 102 in response to detecting audio matching a stored wake-up phrase. Accordingly, the enrollment module 202 permits a user of the computing device 102 to establish and/or update the particular wake-up phrase, which is stored in the security policy 120 of the computing device 102. In doing so, the enrollment module 202 may prompt the user to state a particular wake-up phrase a certain number of times during an enrollment process. It should be appreciated that, depending on the particular embodiment, the wake-up phrase may be user-independent (e.g., speaker-independent) or user-dependent as described below.

Additionally, as discussed in more detail below, the computing device 102 allows for authenticated audio login (e.g., voice-based biometric login). For example, after the computing device 102 is waken from the low-power sleep state, the computing device 102 may prompt the user for login information prior to granting the user access to resources of the computing device 102. As such, the enrollment module 202 receives from the user audio input of the characters from which a security token may be composed (i.e., the global set of available security token characters) and stores the audio input (e.g., after preprocessing) as voice profile data 218 in the voice profile database 122 of the computing device 102. In the illustrative embodiment, the voice profile database 122 includes voice profile data 218 for each user authorized to login to the computing device 102 (i.e., received/processed during the users' enrollment).

The token management module 204 securely generates security tokens, which may be used to authenticate the current user of the computing device 102, and renders the security tokens to the current user of the computing device 102 via the output device(s) 132. In the illustrative embodiment, the token management module 204 includes the token generation module 210 and the token rendering module 212. The token generation module 210 generates a security token including a plurality of token characters selected from a set of predefined token characters. As discussed below, audio input of the current user of the computing device 102 is compared with the generated security token to determine whether the current user is authorized to login to the computing device 102 (i.e., whether the current user is a user for which voice profile data 218 is stored on the computing device 102).

It should be appreciated that the set of characters from which the security tokens are generated may comprise, for example, alphanumeric characters, words, phrases, audible sounds (e.g., word syllables), symbols, drawings, pictures, or other suitable characters. Additionally, the mechanisms, technologies, and/or algorithms for generating the security tokens may vary by embodiment. For example, the security token may be generated based on a cryptographic algorithm (e.g., based on a cryptographic key), as a random or pseudorandom number or other sequence of characters, and/or as a one-time use security token. In some embodiments, the security token is generated as a Rivest-Shamir-Adleman (RSA) SecurID security token. Further, in some embodiments, the security token may be generated remotely (e.g., on the authentication server 106) and securely transmitted to the computing device 102 over the network 104.

The token rendering module 212 renders the generated security token to a current user of the computing device 102 on an output device 132 of the computing device 102. For example, the token rendering module 212 may display the generated security token on the display 134 for the current user to view. In some embodiments, the token rendering module 212 may, alternatively or additionally, output the generated security token on the speaker 136 (e.g., to allow for a hands-off approach to login authentication). In doing so, the token rendering module 212 may format the generated security token into an audio format (e.g., based on a text-to-speech algorithm) and render the formatted security token to the user on the speaker 136.

The authentication module 206 monitors data received by one or more inputs of the computing device 102 (e.g., the microphone 130), determines whether to wake the computing device 102 from a low-power sleep state, and determines whether the current user is authorized to login to the computing device 102. It should be appreciated that, in some embodiments, the authentication module 206 forms a portion of, or is executed by, the audio co-processor 124. As shown, in the illustrative embodiment, the authentication module 206 includes the wake-up authentication module 214 and the login authentication module 216. As discussed above, the computing device 102 may securely store a wake-up phrase (e.g., a default phrase or a phrase selected by the user) for the computing device 102. The wake-up authentication module 214 receives input (e.g., audio input) from the current user of the computing device 102 while the computing device 102 is in a low-power sleep state and compares the input to the stored wake-up phrase. For example, the audio co-processor 124 and/or the wake-up authentication module 214 may monitor for and detect voice activity of the current user of the computing device 102. As discussed below, if the received input matches the stored wake-up phrase, the wake-up authentication module 214 wakes the computing device 102 from the low-power sleep state.

The login authentication module 216 receives audio input from the current user of the computing device 102 and determines whether the current user is an authorized user of the computing device 102 based on voice profile data 218 of the voice profile database 122. As discussed below, to do so, the login authentication module 216 retrieves voice profile data 218 of an authorized user of the computing device 102 and compares the received audio input to the retrieved voice profile data 218. More specifically, the login authentication module 216 retrieves voice data of each token character of the rendered security token from the voice profile database 122 and compares the retrieved voice data of each token character with the corresponding characters of the user's audio input.

The communication module 208 handles the communication between the computing device 102 and remote devices (e.g., the authentication server 106) through the network 104. As discussed above, the communication module 208 may securely communicate with the authentication server 106 to receive the security token from the authentication server 106. In other embodiments, the voice profile database 122 may be stored remotely (e.g., in a cloud computing environment), and the communication module 208 may retrieved the voice profile data 218 over the network 104.

Figure 3:
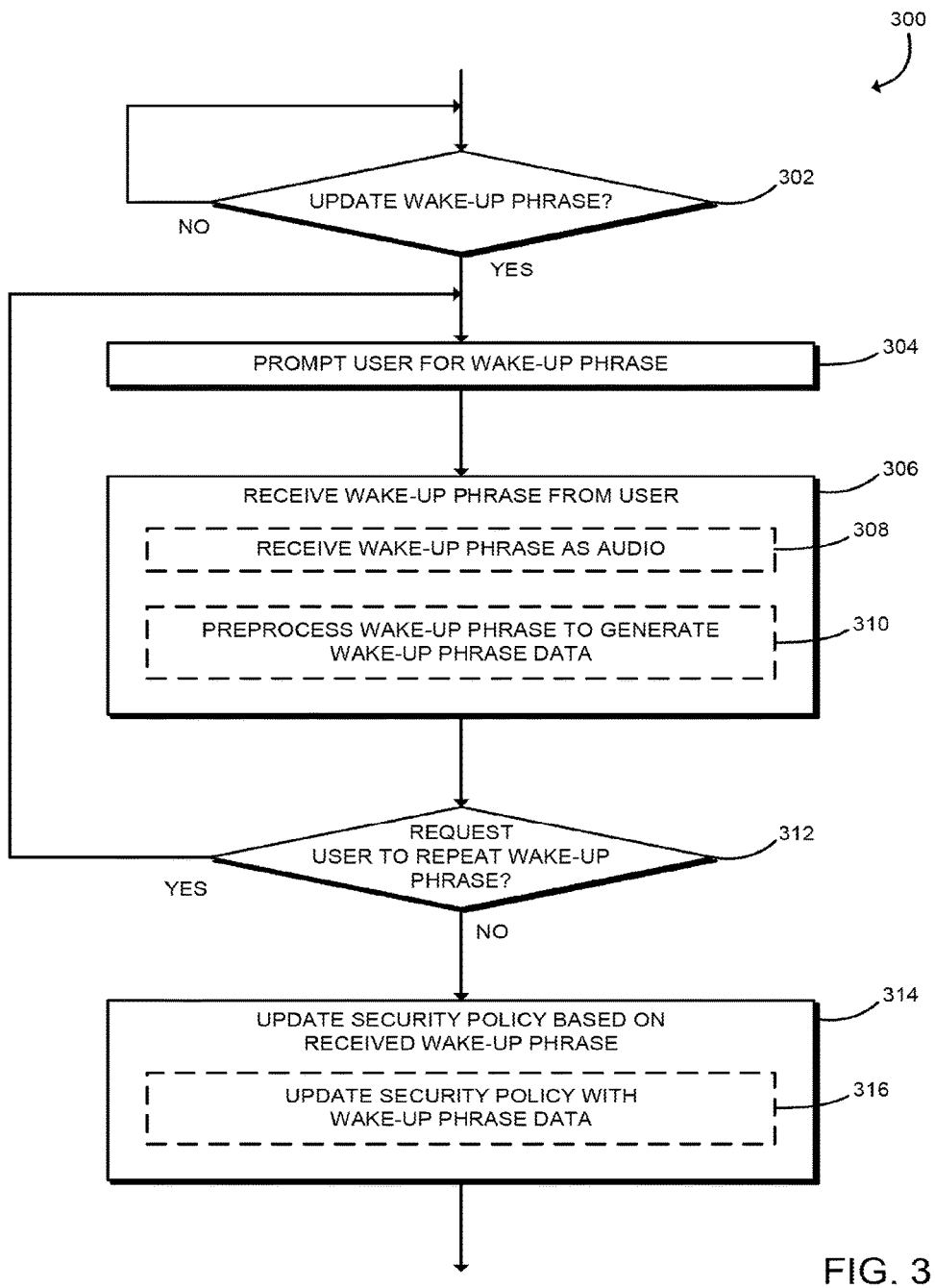
FIG. 3 is a simplified flow diagram of at least one embodiment of a method for updating a wake-up phrase by the computing device of FIG. 1.

Referring now to FIG. 3, in use, the computing device 102 may execute a method 300 for updating a wake-up phrase of the computing device 102. The illustrative method 300 begins with block 302 in which the computing device 102 determines whether to update the wake-up phrase for the computing device 102 (i.e., a phrase to wake the computing device 102 from a low-power sleep state via audio input). Depending on the particular embodiment, the computing device 102 may update a preconfigured default wake-up phrase of the computing device 102 or change the user's previously stored wake-up phrase. If the computing device 102 determines to update the wake-up phrase (e.g., based on user input), the computing device 102 prompts the user for the new/updated wake-up phrase in block 304 (e.g., via the output devices 132). It should be appreciated that, in some embodiments, the user is able to update the wake-up phrase only after the user's identity being authenticated.

In block 306, the computing device 102 receives the new/updated wake-up phrase from the user. In the illustrative embodiment, the wake-up phrase of the computing device 102 is user-independent in the sense that it is not associated with any biometric characteristics of the user. For example, in the illustrative embodiment, the computing device 102 does not rely on biometric voice data to authenticated a spoken wake-up phrase. That is, two different users could say the same wake-up phrase and, assuming it is the correct wake-up phrase, each user would be cause the computing device 102 to wake from the low-power sleep state. Accordingly, depending on the particular embodiment, the user may use any suitable input type for providing the new wake-up phrase (e.g., text, audio, etc.). Of course, in other embodiments, the wake-up authentication may be based on biometric data. That is, the wake-up phrase may be user- or speaker-dependent.

In some embodiments, in block 308, the computing device 102 may receive the new wake-up phrase from the user as audio input (e.g., permitting a hands-off approach).

For example, the user may update the wake-up phrase to be "wake up," "turn on," or some other suitable, audible wake-up phrase. Additionally, in block 310, the computing device 102 may preprocess the received wake-up phrase to generate wake-up phrase data. That is, the computing device 102 may format the wake-up phrase into a format suitable for storage and/or for comparison to subsequent audio input of a user of the computing device 102.

In block 312, the computing device 102 determines whether to request the user to repeat the wake-up phase. For example, in embodiments in which audio input is used, the computing device 102 may request the user to provide the wake-up phrase a predetermined number of times (e.g., three times) to ensure that the computing device 102 accurately understands the audio input of the user (e.g., using speech recognition algorithms). Additionally or alternatively, the computing device 102 may analyze the received audio input to determine its clarity or suitability and request the user to repeat the wake-up phrase accordingly. In embodiments in which other input mechanisms are used, the computing device 102 may request the user to repeat the wake-up phrase to confirm that the wake-up phrase was accurately input (e.g., no unintended character transposition). If the computing device 102 determines the user is to repeat the wake-up phrase, the method 300 returns to block 304 in which the computing device 102 again prompts the user for the wake-up phrase. However, if the computing device 102 determines that the user need not repeat the wake-up phrase, the computing device 102 updates the security policy 120 based on the received wake-up phrase in block 314. In doing so, the computing device 102 may, in block 316, update the security policy 120 with the wake-up phrase data generated based on the wake-up phrase.

Figure 4:
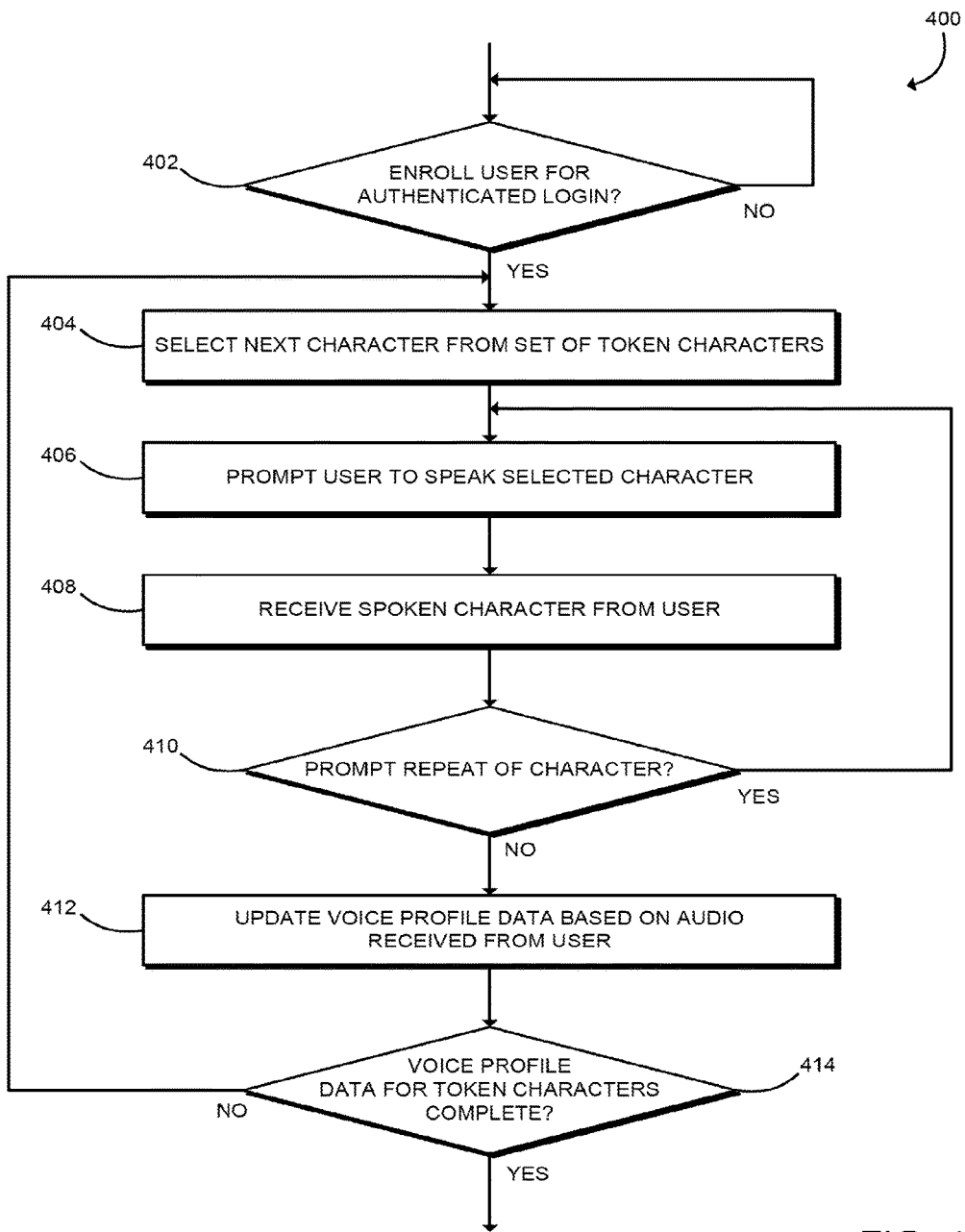
FIG. 4 is a simplified flow diagram of at least one embodiment of a method for enrolling a user for authenticated login by the computing device of FIG. 1.

Referring now to FIG. 4, in use, the computing device 102 may execute a method 400 for enrolling a user for authenticated login by the computing device 102. The illustrative method 400 begins with block 402 in which the computing device 102 determines whether to enroll the user for authenticated login. More specifically, the computing device 102 determines whether to generate a voice profile for a particular user of the computing device 102 in order to enable the user to login to the computing device 102 using voice input. If so, the computing device 102 requests the enrolling user to speak each of the token characters of the set of token characters from which the security token may be composed to enable the computing device 102 to generate voice profile data for the user based on each of the token characters.

In particular, the computing device 102 selects the next character from the set of token characters in block 404 (i.e., a character that has not yet been selected) and prompts the user to speak the selected character in block 406. For example, the computing device 102 may display the selected character or audibly request the user to speak the selected character (e.g., via a text-to-speech mechanism). In block 408, the computing device 102 receives the spoken character from the user via the microphone 130. That is, the user audibly recites the character displayed, or otherwise output, to the user for repeating, which is received by the computing device 102. In block 410, the computing device 102 determines whether to prompt the user to repeat the selected character. That is, the computing device 102 may require the user to repeat particular characters a predetermined number of times (e.g., three times), and/or in response to analysis of the previously spoken character, in order to generate a pruned biometric voice model/profile and language files (i.e., voice data) for the particular user. It should be appreciated that the computing device 102 may use any suitable algorithms, technologies, and/or mechanisms for generating voice data for the user. In some embodiments, the computing device 102 generates a biometric voiceprint for the user based on the audio input of the selected character.

If the computing device 102 determines to prompt the user to repeat the selected character, the method 400 returns to block 406 in which the computing device 102 prompts the user to speak the selected character. Otherwise, the computing device 102 updates the voice profile data 218 for the user based on the audio received from the user in block 412. In the illustrative embodiment, the computing device 102 formats the audio received from the user into a format suitable for subsequent comparison to audio input of a user of the computing device 102 (i.e., voice data) and stores the voice data for the particular character in the voice profile database 122. In block 414, the computing device 102 determines whether the voice profile data 218 for the token characters is complete. That is, the computing device 102 determines whether voice data has been generated and stored in the voice profile database 122 for each of the token characters. If not, the method 400 returns to block 404 in which the computing device 102 selects the next character from the set of token characters.

Figure 5:
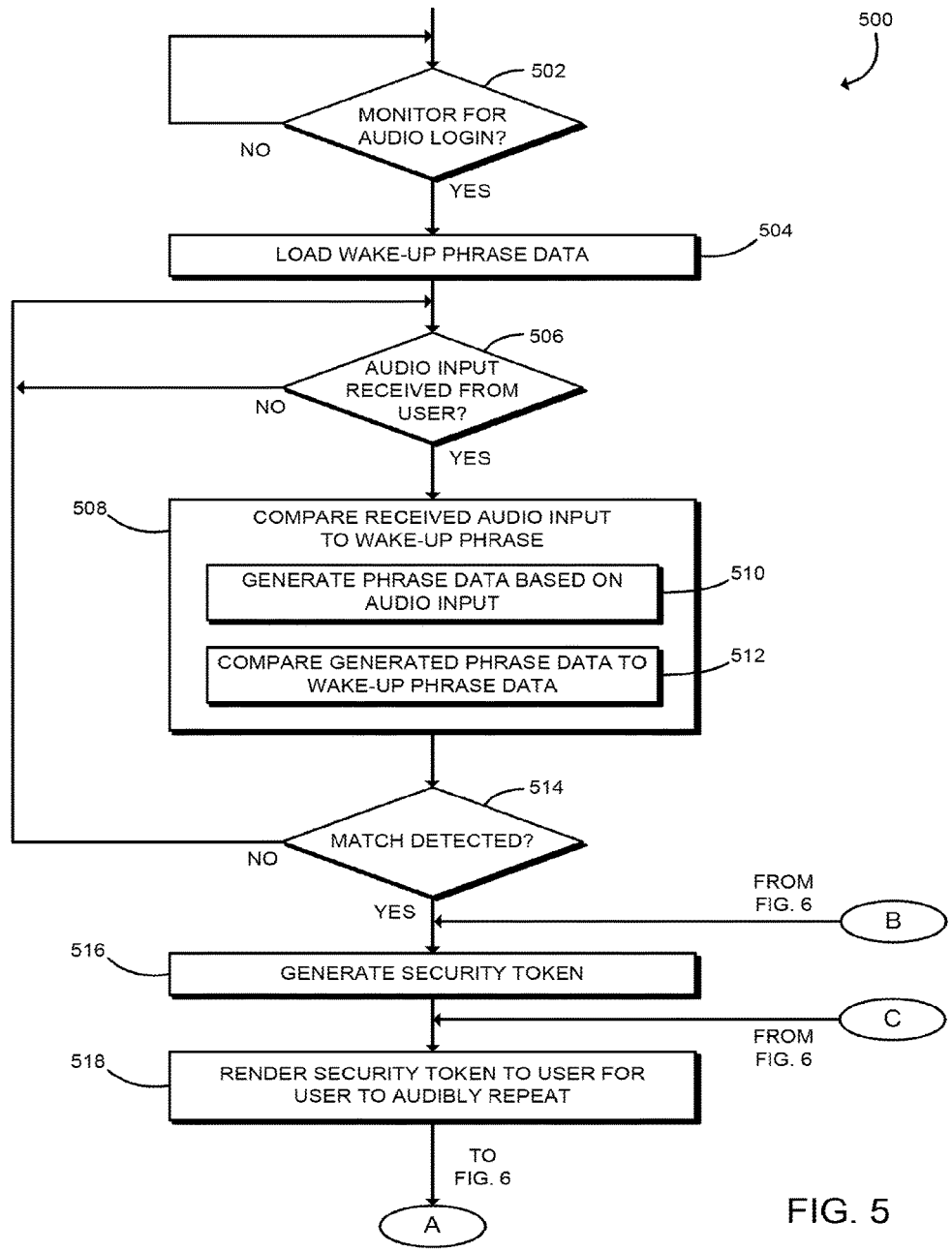
FIGS. 5-6 are a simplified flow diagram of at least one embodiment of a method for authenticated login by a user of the computing device of FIG. 1.
Figure 6:
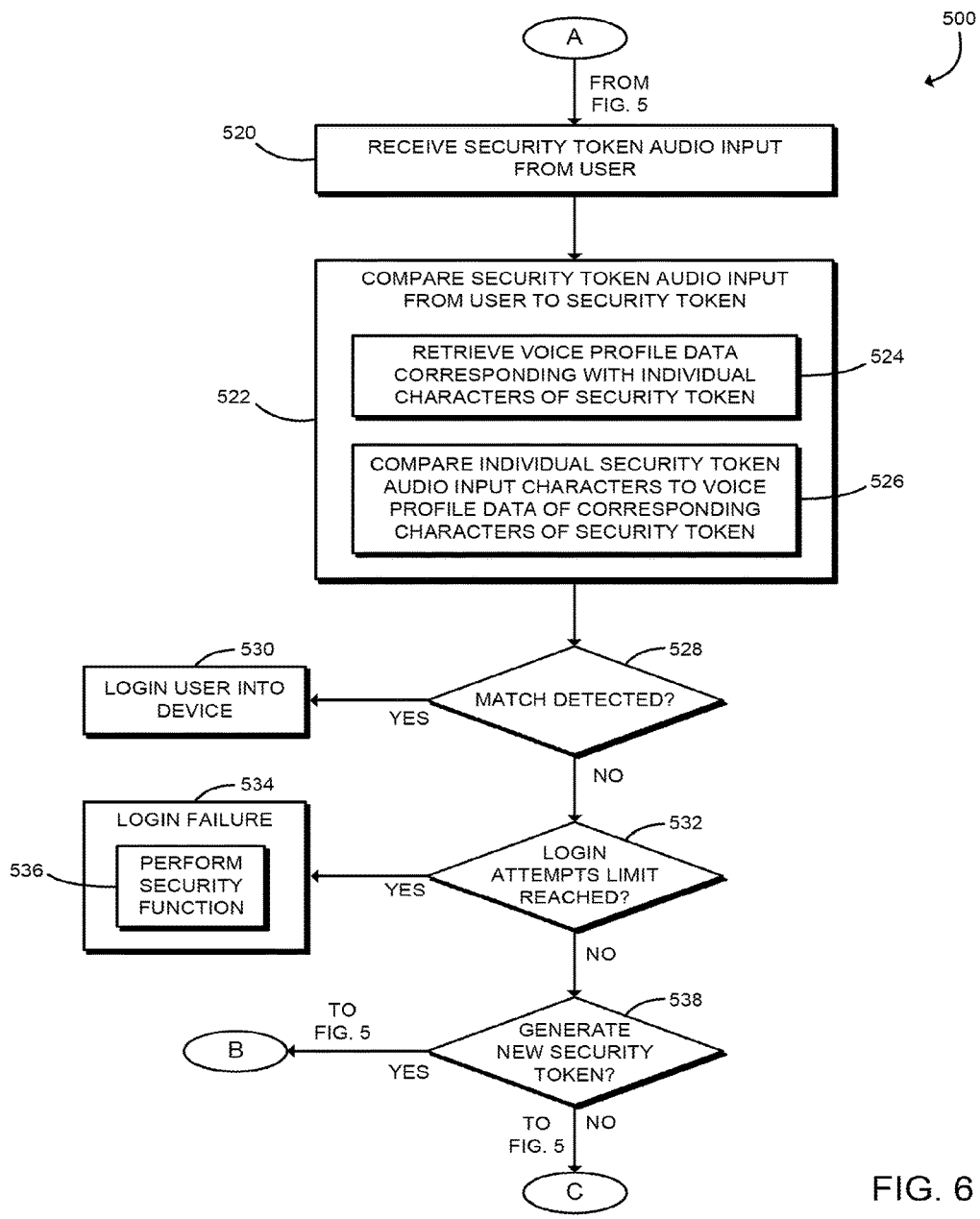

Referring now to FIGS. 5-6, in use, the computing device 102 may execute a method 500 for authenticated login by a user of the computing device 102. The illustrative method 500 begins with block 502 (see FIG. 5) in which the computing device 102 determines whether to monitor for audio login. If so, the computing device 102 loads wake-up phrase data in block 504. As discussed above, an authorized user of the computing device 102 may register a wake-up phrase with the computing device 102 such that the computing device 102 will wake from a low-power sleep state in response to recognizing audio input of a current user of the computing device 102 corresponding with that wake-up phrase. In some embodiments, the audio co-processor 124 loads the wake-up phrase data from the security policy 120 when the computing device 102 is placed in the low-power sleep state and monitors audio input for a match with the wake-up phrase data. In another embodiment, an audio driver of the audio co-processor 124 loads the wake-up phrase data for audio detection/recognition during initialization of the audio co-processor 124.

In block 506, the computing device 102 determines whether audio input has been received from the user (e.g., via the microphone 130). If so, the computing device 102 compares the received audio input to the stored/registered wake-up phrase in block 508. In doing so, the computing device 102 generates phrase data based on received audio input in block 510 (e.g., by formatting the audio into a format suitable for comparison to the stored wake-up phrase data) and compares the generated phrase data to the stored wake-up phrase data in block 512. It should be appreciated that, in some embodiments, more than one wake-up phrase may be stored in the security policy 120 of the computing device 102 (e.g., each user may establish his or her own wake-up phrase). Accordingly, in some embodiments, the computing device 102 compares the generated phrase data to each stored wake-up phrase or corresponding wake-up phrase data. As discussed above, in the illustrative embodiment, the wake-up phrase is user-independent in the sense that it is not associated with any biometric characteristics of the user. As such, in an embodiment in which each user establishes his or her own wake-up phrase, the computing device 102 may still compare the generated phrase data to each stored wake-up phrase. However, the computing device 102 may utilize the matched wake-up phrase, for example, to identify which user's voice profile data 218 to retrieve as discussed below. In other embodiments, the computing device 102 may retrieve the voice profile data 218 for each enrolled user for comparison to audio input.

In block 514, the computing device 102 determines whether there is a match between the phrase data and the stored wake-up phrase data (i.e., whether the user spoke the wake-up phrase). If not, the method 500 returns to block 506 to monitor for audio input received from the user. However, if a match is detected in block 514, the computing device 102 generates a security token in block 516. In the illustrative embodiment, the audio co-processor 124 wakes the computing device 102 from the low-power sleep state if a match is detected (e.g., by transmitting a notification to a system service) prior to generating the security token. In other embodiments, however, the audio co-processor 124 may handle all authentication mechanisms and also may only wake the computing device 102 after the current user is authenticated. In such an embodiment, the audio co-processor 124 may communicate with one or more output devices 132 of the computing device 102 to render the security token for the user as discussed in detail below.

As discussed above, the security token is composed of a sequence (i.e., an ordered list) of characters selected from a predefined set of token characters (e.g., alphanumeric characters, words, phrases, symbols, audible sounds, or other characters). Additionally, the security token may be generated as a random one-time use security token and/or may be generated as an RSA SecurID security token in some embodiments. For example, the computing device 102 may securely generate the security token as a pseudorandom six-digit number based on RSA SecurID or another suitable technology.

In block 518, the computing device 102 renders the security token to the user for the user to audibly repeat. As discussed above, the security token may be rendered on any suitable output device 132 of the computing device 102 (e.g., the display 134 and/or the speaker 136). In block 520 (see FIG. 6), the computing device 102 receives security token audio input from the current user of the computing device 102. That is, the computing device 102 receives the current user's audible recitation of the rendered security token. In block 522, the computing device 102 compares the security token audio input received from the current user with the rendered security token. In doing so, the computing device 102 retrieves voice profile data 218 corresponding with the individual characters of the rendered security token in block 524 and compares the individual security token audio input characters to the voice profile data 218 of the corresponding characters of the rendered security token in block 526. That is, the individual characters spoken by the current user of the computing device 102 are compared on a one-to-one basis to the corresponding voice data for the individual security token characters (e.g., after formatting the audio input into a data type suitable for comparison to the voice profile data 218). That is, the first security token character is compared to the first spoken character, the second security token character is compared to the second spoken character, and so on. It should be appreciated that, in some embodiments, the audio input is compared to only a subset of the characters of the security token. For example, in an embodiment, the security token may be a six-digit random number (e.g., an RSA SecurID), and the computing device 102 may compare only a portion of the security token (e.g., the first four digits) to the audio input.

In block 528, the computing device 102 determines whether there is a match between the security token audio input and the security token (i.e., a match between each of the corresponding characters). It should be appreciated that, in some embodiments, the security policy 120 may require only a threshold percentage of characters to match (e.g., 90%). If there is a match, the computing device 102 logs the user into the computing device 102 in block 530. If not, the computing device 102 determines, in block 532, whether a limit for the number of login attempts has been reached (e.g., based on the security policy 120). For example, in one embodiment, the user is only given three chances to provide the correct login phrase to the computing device 102. Additionally, in some embodiments, the user is given a limited amount of time to audibly repeat the rendered security token (e.g., to reduce the risk of audio playback attacks). If the retry or temporal limit has been reached, the computing device 102 detects a login failure in block 534 and performs a suitable security function in block 536. The security function may vary depending on the particular embodiment and may include, for example, locking the computing device 102 for a predetermined period of time. If the login limit has not been reached, the computing device determines whether to generate a new security token in block 538. If so, the method 500 returns to block 516 (see FIG. 5) in which the computing device 102 generates a security token. However, if the computing device 102 determines in block 538 not to generate a new security token, the method 500 returns to block 518 (see FIG. 5) in which the computing device 102 renders the previously generated security token to the user. In other words, in some circumstances, the computing device 102 may generate a new security token if the audio input does not match the characters of the rendered security token, whereas in other circumstances, the computing device 102 may redisplay the previously generated security token for the user.

EXAMPLES

Illustrative examples of the technologies disclosed herein are provided below. An embodiment of the technologies may include any one or more, and any combination of, the examples described below.

Example 1 includes a computing device for authenticated audio login by a user of the computing device, the computing device comprising a token management module to (i) generate a security token including a plurality of token characters and (ii) render the generated security token to a current user of the computing device on an output device of the computing device; and an authentication module to (i) receive security token audio input from the current user, (ii) retrieve, based on the rendered security token, voice profile data of an authorized user of the computing device from a voice profile database, and (iii) compare the received security token audio input and the retrieved voice profile data to verify that the current user is the authorized user and recited the rendered security token, wherein the voice profile database includes voice data based on the authorized user's prior recitation of each token character of a set of token characters from which the security token may be composed.

Example 2 includes the subject matter of Example 1, and further including an audio co-processor to (i) receive wake-up audio input from a user of the computing device while the computing device is in a low-power sleep state, (ii) compare the received wake-up audio input to a stored wake-up phrase for the computing device, and (iii) wake the computing device from the low-power sleep state in response to a determination that the received wake-up audio input matches the stored wake-up phrase.

Example 3 includes the subject matter of any of Examples 1 and 2, and wherein to compare the received wake-up audio input to the stored wake-up phrase comprises to generate phrase data based on the received wake-up audio input; and compare the generated phrase data to wake-up phrase data corresponding to the stored wake-up phrase, wherein the wake-up phrase data is user-dependent.

Example 4 includes the subject matter of any of Examples 1-3, and wherein to compare the received wake-up audio input to the stored wake-up phrase comprises to generate phrase data based on the received wake-up audio input; and compare the generated phrase data to wake-up phrase data corresponding to the stored wake-up phrase, wherein the wake-up phrase data is user-independent.

Example 5 includes the subject matter of any of Examples 1-4, and wherein to generate the security token comprises to generate a one-time use random or pseudorandom number to be stored securely on the computing device.

Example 6 includes the subject matter of any of Examples 1-5, and wherein to generate the security token comprises to generate a security token having a plurality of token characters based on a cryptographic algorithm.

Example 7 includes the subject matter of any of Examples 1-6, and wherein the security token comprises a Rivest-Shamir-Adleman (RSA) SecurID security token.

Example 8 includes the subject matter of any of Examples 1-7, and wherein to render the generated security token comprises to format the generated security token in an audio format based on a text-to-speech algorithm; and render the formatted generated security token to a current user of the computing device on a speaker of the computing device.

Example 9 includes the subject matter of any of Examples 1-8, and wherein to receive the security token audio input from the current user comprises to receive an audible recitation of the rendered security token by the current user.

Example 10 includes the subject matter of any of Examples 1-9, and wherein to receive the security token audio input comprises to receive the security token audio input by an audio co-processor of the computing device; retrieve the voice profile data comprises to retrieve the voice profile data by the audio co-processor; and compare the received security token audio input and the retrieved voice profile data comprises to compare the received security token audio input and the retrieved voice profile data by the audio co-processor.

Example 11 includes the subject matter of any of Examples 1-10, and wherein to retrieve the voice profile data comprises to retrieve voice data of each token character of the security token from the voice profile database; and compare the received security token audio input and the retrieved voice profile data comprises to compare the retrieved voice data of each token character of the security token and the corresponding characters of the security token audio input.

Example 12 includes the subject matter of any of Examples 1-11, and wherein to retrieve the voice profile data comprises to retrieve voice data of a subset, less than the entire set, of the token characters of the security token from the voice profile database; and compare the received security token audio input and the retrieved voice profile data comprises to compare the retrieved voice data of the token characters of the security token and the corresponding characters of the corresponding subset of characters of the security token audio input.

Example 13 includes the subject matter of any of Examples 1-12, and wherein to compare the received security token audio input and the retrieved voice profile data comprises to process the received security token audio input to generate corresponding data suitable for comparison to the retrieved voice profile data.

Example 14 includes the subject matter of any of Examples 1-13, and wherein the token management module is to generate a new security token in response to a determination that the received security token audio input does not match the received voice profile data of the authorized user.

Example 15 includes the subject matter of any of Examples 1-14, and further including an enrollment module to generate voice profile data for the authorized user prior to generation of the security token by the token management module.

Example 16 includes a method for authenticated audio login by a user of a computing device, the method comprising generating, by the computing device, a security token having a plurality of token characters; rendering, by the computing device, the generated security token to a current user of the computing device on an output device of the computing device; receiving, by the computing device, security token audio input from the current user; retrieving, based on the rendered security token, voice profile data of an authorized user of the computing device from a voice profile database, the voice profile database including voice data based on the authorized user's prior recitation of each token character of a set of token characters from which the security token may be composed; comparing, by the computing device, the received security token audio input and the retrieved voice profile data to verify that the current user (i) is the authenticated user and (ii) recited the rendered security token.

Example 17 includes the subject matter of Example 16, and further including receiving, by an audio co-processor of the computing device, wake-up audio input from a user of the computing device while the computing device is in a low-power sleep state; comparing, by the audio co-processor, the received wake-up audio input to a stored wake-up phrase for the computing device; and waking, by the audio co-processor, the computing device from the low-power sleep state in response to determining that the received wake-up audio input matches the stored wake-up phrase.

Example 18 includes the subject matter of any of Examples 16 and 17, and wherein comparing the received wake-up audio input to the stored wake-up phrase comprises generating phrase data based on the received wake-up audio input; and comparing the generated phrase data to wake-up phrase data corresponding to the stored wake-up phrase, the wake-up phrase data being user-dependent.

Example 19 includes the subject matter of any of Examples 16-18, and wherein comparing the received wake-up audio input to the stored wake-up phrase comprises generating phrase data based on the received wake-up audio input; and comparing the generated phrase data to wake-up phrase data corresponding to the stored wake-up phrase, the wake-up phrase data being user-independent.

Example 20 includes the subject matter of any of Examples 16-19, and wherein generating the security token comprises generating a one-time use random or pseudorandom number to be stored securely on the computing device.

Example 21 includes the subject matter of any of Examples 16-20, and wherein generating the security token comprises generating a security token having a plurality of token characters based on a cryptographic algorithm.

Example 22 includes the subject matter of any of Examples 16-21, and wherein generating the security token comprises generating a Rivest-Shamir-Adleman (RSA) SecurID security token.

Example 23 includes the subject matter of any of Examples 16-22, and wherein rendering the generated security token comprises formatting the generated security token in an audio format based on a text-to-speech algorithm; and rendering the formatted generated security token to a current user of the computing device on a speaker of the computing device.

Example 24 includes the subject matter of any of Examples 16-23, and wherein receiving the security token audio input from the current user comprises receiving an audible recitation of the rendered security token by the current user.

Example 25 includes the subject matter of any of Examples 16-24, and wherein receiving the security token audio input comprises receiving the security token audio input by an audio co-processor of the computing device; retrieving the voice profile data comprises retrieving the voice profile data by the audio co-processor; and comparing the received security token audio input and the retrieved voice profile data comprises comparing the received security token audio input and the retrieved voice profile data by the audio co-processor.

Example 26 includes the subject matter of any of Examples 16-25, and wherein retrieving the voice profile data comprises retrieving voice data of each token character of the security token from the voice profile database; and comparing the received security token audio input and the retrieved voice profile data comprises comparing the retrieved voice data of each token character of the security token and the corresponding characters of the security token audio input.

Example 27 includes the subject matter of any of Examples 16-26, and wherein retrieving the voice profile data comprises retrieving voice data of a subset, less than the entire set, of the token characters of the security token from the voice profile database; and comparing the received security token audio input and the retrieved voice profile data comprises comparing the retrieved voice data of the token characters of the security token and the corresponding characters of the corresponding subset of characters of the security token audio input.

Example 28 includes the subject matter of any of Examples 16-27, and wherein comparing the received security token audio input and the retrieved voice profile data comprises processing the received security token audio input to generate corresponding data suitable for comparison to the retrieved voice profile data.

Example 29 includes the subject matter of any of Examples 16-28, and further including generating, by the computing device, a new security token in response to determining the received security token audio input does not match the received voice profile data of the authorized user.

Example 30 includes the subject matter of any of Examples 16-29, and further including generating, by the computing device, the voice profile data for the authorized user prior to generating the security token.

Example 31 includes a computing device comprising a processor; and a memory having stored therein a plurality of instructions that when executed by the processor cause the computing device to perform the method of any of Examples 16-30.

Example 32 includes one or more machine-readable storage media comprising a plurality of instructions stored thereon that, in response to being executed, result in a computing device performing the method of any of Examples 16-30.

Example 33 includes a computing device for authenticated audio login by a user of the computing device, the computing device comprising means for generating a security token having a plurality of token characters; means for rendering the generated security token to a current user of the computing device on an output device of the computing device; means for receiving security token audio input from the current user; means for retrieving, based on the rendered security token, voice profile data of an authorized user of the computing device from a voice profile database, the voice profile database including voice data based on the authorized user's prior recitation of each token character of a set of token characters from which the security token may be composed; means for comparing the received security token audio input and the retrieved voice profile data to verify that the current user (i) is the authenticated user and (ii) recited the rendered security token.

Example 34 includes the subject matter of Example 33, and further including means for receiving, by an audio co-processor of the computing device, wake-up audio input from a user of the computing device while the computing device is in a low-power sleep state; means for comparing, by the audio co-processor, the received wake-up audio input to a stored wake-up phrase for the computing device; and means for waking, by the audio co-processor, the computing device from the low-power sleep state in response to determining that the received wake-up audio input matches the stored wake-up phrase.

Example 35 includes the subject matter of any of Examples 33 and 34, and wherein the means for comparing the received wake-up audio input to the stored wake-up phrase comprises means for generating phrase data based on the received wake-up audio input; and means for comparing the generated phrase data to wake-up phrase data corresponding to the stored wake-up phrase, the wake-up phrase data being user-dependent.

Example 36 includes the subject matter of any of Examples 33-35, and wherein the means for comparing the received wake-up audio input to the stored wake-up phrase comprises means for generating phrase data based on the received wake-up audio input; and means for comparing the generated phrase data to wake-up phrase data corresponding to the stored wake-up phrase, the wake-up phrase data being user-independent.

Example 37 includes the subject matter of any of Examples 33-36, and wherein the means for generating the security token comprises means for generating a one-time use random or pseudorandom number to be stored securely on the computing device.

Example 38 includes the subject matter of any of Examples 33-37, and wherein the means for generating the security token comprises means for generating a security token having a plurality of token characters based on a cryptographic algorithm.

Example 39 includes the subject matter of any of Examples 33-38, and wherein the means for generating the security token comprises means for generating a Rivest-Shamir-Adleman (RSA) SecurID security token.

Example 40 includes the subject matter of any of Examples 33-39, and wherein the means for rendering the generated security token comprises means for formatting the generated security token in an audio format based on a text-to-speech algorithm; and means for rendering the formatted generated security token to a current user of the computing device on a speaker of the computing device.

Example 41 includes the subject matter of any of Examples 33-40, and wherein the means for receiving the security token audio input from the current user comprises means for receiving an audible recitation of the rendered security token by the current user.

Example 42 includes the subject matter of any of Examples 33-41, and wherein the means for receiving the security token audio input comprises means for receiving the security token audio input by an audio co-processor of the computing device; the means for retrieving the voice profile data comprises means for retrieving the voice profile data by the audio co-processor; and the means for comparing the received security token audio input and the retrieved voice profile data comprises means for comparing the received security token audio input and the retrieved voice profile data by the audio co-processor.

Example 43 includes the subject matter of any of Examples 33-42, and wherein the means for retrieving the voice profile data comprises means for retrieving voice data of each token character of the security token from the voice profile database; and the means for comparing the received security token audio input and the retrieved voice profile data comprises means for comparing the retrieved voice data of each token character of the security token and the corresponding characters of the security token audio input.

Example 44 includes the subject matter of any of Examples 33-43, and wherein the means for retrieving the voice profile data comprises means for retrieving voice data of a subset, less than the entire set, of the token characters of the security token from the voice profile database; and the means for comparing the received security token audio input and the retrieved voice profile data comprises means for comparing the retrieved voice data of the token characters of the security token and the corresponding characters of the corresponding subset of characters of the security token audio input.

Example 45 includes the subject matter of any of Examples 33-44, and wherein the means for comparing the received security token audio input and the retrieved voice profile data comprises means for processing the received security token audio input to generate corresponding data suitable for comparison to the retrieved voice profile data.

Example 46 includes the subject matter of any of Examples 33-45, and further including means for generating a new security token in response to a determination that the received security token audio input does not match the received voice profile data of the authorized user.

Example 47 includes the subject matter of any of Examples 33-46, and further including means for generating the voice profile data for the authorized user prior to generation of the security token.

The invention claimed is:

1. A computing device for authenticated audio login by a user of the computing device, the computing device comprising:
    a memory having stored thereon a plurality of instructions that, when executed by a processor, causes the computing device to:
        receive a wake-up audio input from a user of the computing device while the computing device is in a low-power sleep state;
        compare the received wake-up audio input to a stored wake-up phrase for the computing device;
        wake the computing device from the low-power sleep state in response to a determination that the received wake-up audio input matches the stored wake-up phrase, wherein the stored wake-up phrase is user-independent;
        generate a security token including a plurality of individual token characters in response to the determination that the received wake-up audio input matches the stored wake-up phrase;
        display the generated security token to a current user of the computing device on an output device of the computing device;
        receive security token audio input from the current user;
        separately retrieve, from a voice profile database, voice profile data of an authorized user of the computing device for a subset, less than the entire set, of the token characters of the displayed security token; and
        compare the received security token audio input and the retrieved voice profile data corresponding to the subset of the token characters of the displayed security token to verify that the current user is the authorized user and recited the displayed security token,
    wherein the voice profile database includes voice data based on the authorized user's prior recitation of each token character of a set of token characters from which the security token may be composed.

2. The computing device of claim 1, further comprising an audio co-processor to (i) receive the wake-up audio input from the user of the computing device while the computing device is in a low-power sleep state, (ii) compare the received wake-up audio input to the stored wake-up phrase for the computing device, and (iii) wake the computing device from the low-power sleep state in response to the determination that the received wake-up audio input matches the stored wake-up phrase.

3. The computing device of claim 2, wherein to compare the received wake-up audio input to the stored wake-up phrase comprises to:
    generate phrase data based on the received wake-up audio input; and
    compare the generated phrase data to wake-up phrase data corresponding to the stored wake-up phrase.

4. The computing device of claim 1, wherein to generate the security token comprises to generate a one-time use random or pseudorandom number to be stored securely on the computing device.

5. The computing device of claim 1, wherein to generate the security token comprises to generate a security token having a plurality of token characters based on a cryptographic algorithm.

6. The computing device of claim 1, wherein the security token comprises a Rivest-Shamir-Adleman (RSA) SecurID security token.

7. The computing device of claim 1, wherein to display the generated security token comprises to:
    format the generated security token in an audio format based on a text-to-speech algorithm; and
    display the formatted generated security token to a current user of the computing device on a speaker of the computing device.

8. The computing device of claim 1, wherein to receive the security token audio input from the current user comprises to receive an audible recitation of the displayed security token by the current user.

9. The computing device of claim 1, wherein to:
receive the security token audio input comprises to receive the security token audio input by an audio co-processor of the computing device;
retrieve the voice profile data comprises to retrieve the voice profile data by the audio co-processor; and
compare the received security token audio input and the retrieved voice profile data comprises to compare the received security token audio input and the retrieved voice profile data by the audio co-processor.

10. The computing device of claim 1, wherein to:
retrieve the voice profile data comprises to retrieve voice data of each token character of the security token from the voice profile database; and
compare the received security token audio input and the retrieved voice profile data comprises to compare the retrieved voice data of each token character of the security token and the corresponding characters of the security token audio input.

11. The computing device of claim 1, wherein to compare the received security token audio input and the retrieved voice profile data comprises to process the received security token audio input to generate corresponding data suitable for comparison to the retrieved voice profile data.

12. The computing device of claim 1, wherein the the plurality of instructions, when executed, further causes the computing device to generate a new security token in response to a determination that the received security token audio input does not match the received voice profile data of the authorized user.

13. The computing device of claim 1, the plurality of instructions, when executed, further causes the computing device to generate voice profile data for the authorized user prior to generation of the security token by the token management module.

14. One or more non-transitory machine-readable storage media comprising a plurality of instructions stored thereon that, in response to execution by a computing device, cause the computing device to:
receive a wake-up audio input from a user of the computing device while the computing device is in a low-power sleep state;
compare the received wake-up audio input to a stored wake-up phrase for the computing device;
wake the computing device from the low-power sleep state in response to a determination that the received wake-up audio input matches the stored wake-up phrase, wherein the stored wake-up phrase is user-independent;
generate a security token having a plurality of individual token characters in response to the determination that the received wake-up audio input matches the stored wake-up phrase;
display the generated security token to a current user of the computing device on an output device of the computing device;
receive security token audio input from the current user;
retrieve separately, from a voice profile database, voice profile data of an authorized user of the computing device for a subset, less than the entire set, of the token characters of the displayed security token, the voice profile database including voice data based on the authorized user's prior recitation of each token character of a set of token characters from which the security token may be composed;
compare the received security token audio input and the retrieved voice profile data corresponding to the subset of the token characters, of the displayed security token to verify that the current user (i) is the authenticated user and (ii) recited the displayed security token.

15. The one or more non-transitory machine-readable storage media of claim 14, wherein the plurality of instructions further cause the computing device to:
receive, by an audio co-processor of the computing device, the wake-up audio input from the user of the computing device while the computing device is in a low-power sleep state;
compare, by the audio co-processor, the received wake-up audio input to the stored wake-up phrase for the computing device; and
wake, by the audio co-processor, the computing device from the low-power sleep state in response to the determination that the received wake-up audio input matches the stored wake-up phrase.

16. The one or more non-transitory machine-readable storage media of claim 14, wherein to generate the security token comprises to generate a one-time use random or pseudorandom number to be stored securely on the computing device.

17. The one or more non-transitory machine-readable storage media of claim 14, wherein to generate the security token comprises to generate a security token having a plurality of token characters based on a cryptographic algorithm.

18. The one or more non-transitory machine-readable storage media of claim 14, wherein to receive the security token audio input from the current user comprises to receive an audible recitation of the displayed security token by the current user.

19. The one or more non-transitory machine-readable storage media of claim 14, wherein to:
receive the security token audio input comprises to receive the security token audio input by an audio co-processor of the computing device;
retrieve the voice profile data comprises to retrieve the voice profile data by the audio co-processor; and
compare the received security token audio input and the retrieved voice profile data comprises to compare the received security token audio input and the retrieved voice profile data by the audio co-processor.

20. The one or more non-transitory machine-readable storage media of claim 14, wherein to:
retrieve the voice profile data comprises to retrieve voice data of each token character of the security token from the voice profile database; and
compare the received security token audio input and the retrieved voice profile data comprises to compare the retrieved voice data of each token character of the security token and the corresponding characters of the security token audio input.

21. The one or more non-transitory machine-readable storage media of claim 14, wherein the plurality of instructions further cause the computing device to generate a new security token in response to determining the received security token audio input does not match the received voice profile data of the authorized user.

22. A method for authenticated audio login by a user of a computing device, the method comprising:
receiving a wake-up audio input from a user of the computing device while the computing device is in a low-power sleep state;
comparing the received wake-up audio input to a stored wake-up phrase for the computing device;

waking the computing device from the low-power sleep state in response to determining that the received wake-up audio input matches the stored wake-up phrase, wherein the stored wake-up phrase is user-independent;

generating, by the computing device, a security token having a plurality of individual token characters in response to determining that the received wake-up audio input matches the stored wake-up phrase;

displaying, by the computing device, the generated security token to a current user of the computing device on an output device of the computing device;

receiving, by the computing device, security token audio input from the current user;

retrieving separately, from a voice profile database, voice profile data of an authorized user of the computing device for a subset, less than the entire set, of the token characters of the displayed security token, the voice profile database including voice data based on the authorized user's prior recitation of each token character of a set of token characters from which the security token may be composed;

comparing, by the computing device, the received security token audio input and the retrieved voice profile data corresponding to the subset of the token characters of the displayed security token to verify that the current user (i) is the authenticated user and (ii) recited the displayed security token.

23. The method of claim 22, further comprising:

receiving, by an audio co-processor of the computing device, the wake-up audio input from the user of the computing device while the computing device is in a low-power sleep state;

comparing, by the audio co-processor, the received wake-up audio input to the stored wake-up phrase for the computing device; and waking, by the audio co-processor, the computing device from the low-power sleep state in response to determining that the received wake-up audio input matches the stored wake-up phrase.

\* \* \* \* \*